US012759226B2

(12) United States Patent
Freitag et al.

(10) Patent No.: US 12,759,226 B2
(45) Date of Patent: Oct. 13, 2026

(54) DEVICE AND METHOD FOR MANUFACTURING COMPONENTS TAKING INTO ACCOUNT THE INLINE DETERMINED POURABILITY CHARACTERISTICS OF A POWDER

(71) Applicant: DMG MORI ADDITIVE GmbH, Bielefeld (DE)

(72) Inventors: Michel Freitag, Paderborn (DE); Matthias Himmelsbach, Göttingen (DE); Frank Haverkamp, Lübbecke (DE)

(73) Assignee: DMG MORI ADDITIVE GMBH, Bielefeld (DE)

(*) Notice: Subject to any disclaimer, the term of this patent is extended or adjusted under 35 U.S.C. 154(b) by 88 days.

(21) Appl. No.: 18/833,071

(22) PCT Filed: Nov. 28, 2022

(86) PCT No.: PCT/EP2022/083432
§ 371 (c)(1),
(2) Date: Jul. 25, 2024

(87) PCT Pub. No.: WO2023/147911
PCT Pub. Date: Aug. 10, 2023

(65) Prior Publication Data

US 2025/0162243 A1 May 22, 2025

(30) Foreign Application Priority Data

Feb. 2, 2022 (DE) ........................ 102022102449.0

(51) Int. Cl.
*B29C 64/153* (2017.01)
*B22F 10/28* (2021.01)
(Continued)

(52) U.S. Cl.
CPC ............ *B29C 64/153* (2017.08); *B22F 10/28* (2021.01); *B22F 10/34* (2021.01); *B22F 10/85* (2021.01);
(Continued)

(58) Field of Classification Search
CPC .................................................... B29C 64/329
See application file for complete search history.

(56) References Cited

U.S. PATENT DOCUMENTS

2018/0369917 A1 12/2018 Mottin et al.
2019/0105843 A1 4/2019 Ankit et al.
(Continued)

FOREIGN PATENT DOCUMENTS

DE 102009056688 A1 7/2011
FR 3096284 A1 11/2020
(Continued)

OTHER PUBLICATIONS

International Search Report received in PCT/EP2022/083432, dated Feb. 14, 2023, in 5 pages (with translation).
(Continued)

*Primary Examiner* — Virak Nguon
(74) *Attorney, Agent, or Firm* — Procopio, Cory, Hargreaves & Savitch LLP

(57) ABSTRACT

The present invention relates to a device for manufacturing components layer by layer by locally selective solidification of material powder in a process area by electromagnetic radiation or particle radiation. The device comprises a powder supply for supplying powder P to the process area. The powder supply comprises a powder conduit which is connected to a funnel section 1, and at least one controllable shut-off valve V1, V2 which is arranged downstream of the funnel section 1 in a powder flow direction R. The device
(Continued)

enables inline determination of the pourability characteristics of the powder that is actually used.

16 Claims, 10 Drawing Sheets

(51) Int. Cl.

| | |
|---|---|
| ***B22F 10/34*** | (2021.01) |
| ***B22F 10/85*** | (2021.01) |
| ***B22F 12/53*** | (2021.01) |
| ***B22F 12/90*** | (2021.01) |
| ***B28B 1/00*** | (2006.01) |
| ***B29C 64/321*** | (2017.01) |
| ***B29C 64/393*** | (2017.01) |
| ***B33Y 10/00*** | (2015.01) |
| ***B33Y 30/00*** | (2015.01) |
| ***B33Y 40/00*** | (2020.01) |
| ***B33Y 50/02*** | (2015.01) |

(52) U.S. Cl.

CPC .............. *B22F 12/53* (2021.01); *B22F 12/90* (2021.01); *B28B 1/001* (2013.01); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | | | |
|---|---|---|---|---|
| 2020/0262147 | A1* | 8/2020 | Mamrak | B29C 64/343 |
| 2021/0069987 | A1 | 3/2021 | Roman et al. | |
| 2022/0212266 | A1* | 7/2022 | Jeannot | B22F 12/53 |
| 2024/0269751 | A1* | 8/2024 | Kopschinski | B22F 12/57 |

FOREIGN PATENT DOCUMENTS

| | | | |
|---|---|---|---|
| JP | 2019-039010 | A | 3/2019 |
| WO | 2019211476 | A1 | 11/2019 |

OTHER PUBLICATIONS

Office Action received in DE 102022102449.0, dated Sep. 20, 2022, in 14 pages (with translation).

* cited by examiner

DEVICE AND METHOD FOR MANUFACTURING COMPONENTS TAKING INTO ACCOUNT THE INLINE DETERMINED POURABILITY CHARACTERISTICS OF A POWDER

CROSS-REFERENCE TO RELATED APPLICATIONS

This application is US National Stage of International Patent Application PCT/EP2022/083432, filed Nov. 28, 2022, which claims benefit of priority from German Patent Application 102022102449.0, filed Feb. 2, 2022, the contents of both of which are incorporated herein by reference.

The present invention relates to a device for manufacturing components layer by layer by locally selective solidification of material powder, comprising a powder supply. In addition, the present invention relates to a method for manufacturing components by locally selective solidification of material powder.

A machine according to the present invention is in particular a machine for producing molded members according to the principle of selective laser melting or selective laser sintering. In particular, material powders made of a metal, a metal alloy, a plastic or a ceramic material can be used and processed.

With the selective laser melting or laser sintering process, molded members, such as machine parts, tools, prostheses, pieces of jewelry, or the like, can be manufactured in accordance with the geometry description data (e.g., CAD-data) of the corresponding molded members by forming them layer by layer from a metallic or ceramic material powder or from a plastic powder. In the manufacturing method, the material powder to be consolidated is applied layer by layer to a workpiece table and, depending on the geometry description data, is exposed to electromagnetic radiation or particle radiation, in particular focused laser radiation. The radiation causes heating and consequently fusion or sintering of the material powder of a powder layer, so that certain areas of the powder layer are solidified. The solidified areas correspond to the cross-section of the molded member of the applied material powder layer to be manufactured. After the cross-section of the molded member has solidified in a material layer, the workpiece table is lowered by a layer thickness and a new material powder layer is applied. Now a cross-section of the molded member can be consolidated. This process is repeated until the molded member is formed layer by layer. A teaching of laser melting can be found, for example, in WO 2019/211 476 A1.

For example, JP 2019 039010 A discloses a method for printing a three-dimensional member using an electrophotographic additive manufacturing system. The method comprises the step of creating layers of the three-dimensional part out of the charged part material with an electrophotographic drive.

US 2019/0105843 A1 discloses to deposit a powder mound in a first step in order to identify features relating to the spreading behavior of the powder. A powder pile is generally supplied from a dispenser as a charge or load of material deposited in front of the spreader. A light source is arranged to illuminate one side of the powder deposit thereby resulting in a cast shadow of the powder pile as the powder pile is being distributed by the spreader. Further, a sensor is provided to detect and evaluates the cast shadow.

In conventional systems, it is necessary to remove samples in order to accurately determine the powder characteristics and, in particular, the pourability characteristics of the powder. The powder is therefore removed from the powder circuit or feed circuit of the machine and examined in an external analysis.

DETAILED DESCRIPTION OF THE INVENTION

In order to solve the above-mentioned task, the features of the independent claims are provided. The dependent claims relate to preferred embodiments of the present invention.

A device is provided for manufacturing components layer by layer by locally selective solidification of material powder, which is in powder form, in a process area by electromagnetic radiation or particle radiation. The device may comprise a powder supply for supplying powder to the process area. The powder supply may further comprise a supply line or powder conduit which may be connected to a funnel section, and a controllable shut-off valve, which may be arranged downstream of the funnel section in a powder flow direction. For directly determining the pourability characteristics of the powder, at least one sensor, in particular a mass sensor, may be provided for time-dependent determination of the mass (and/or weight) of the powder which is disposed (directly) in the funnel section or removed (directly) from the funnel section. Thus, an inline determination of the pourability characteristics of the powder that is disposed in the feeder may be achieved without having to remove a powder sample from the feeder circuit or the powder circuit. The inline determination of the pourability characteristics enables a fast and precise determination of the actual powder characteristics in the feed line and the powder supply and so that a time-consuming removal of a powder sample from the circuit is unnecessary. By determining the pourability characteristics directly inline, the process parameters can be directly controlled during the layer-by-layer manufacturing of the components, so that the manufacturing method may be precisely matched to the powder characteristics (e.g., (real-time) monitoring of the manufacturing method).

The pourability characteristics of the powder may be determined inline, therefore in particular directly in the powder supply circuit, without taking a powder sample out of the circuit. The powder with which the pourability characteristics are determined is passed on in the powder circuit and used for the manufacture of the component. Particularly preferably, moreover, the pourability characteristics are determined in the powder feed direction (and/or within the powder circuit), so that the feed sections of the powder feed circuit are used directly to determine the characteristics of the powder. This is achieved by providing a container with a funnel-shaped outlet, as part of the powder feed line. Based on the flow rate of the powder from the funnel, the pourability characteristics of the powder may be determined by determining the time. Preferably, the determined value (time value or weight and/or mass) of the discharged powder can be compared with reference values from a table to determine the pourability characteristics.

Thus, a funnel or funnel section may be provided with a controllable shut-off valve arranged thereunder as well as a device for mass determination for inline determination of the pourability characteristics of the (in particular SLM powder; selective laser melting (SLM)) powder. In a special further development, a defined funnel geometry, borrowed or adopted from the Hall (ISO 4490) or Carney measurement method (ASTM B964), can be used and introduced directly into the powder circuit at suitable points. Preferably, a controllable shut-off valve is arranged downstream of the funnel geometry. The funnel geometry containing the powder and retained by the shut-off valve is arranged so that it can be weighed. In addition, a further device can be arranged downstream of the shut-off valve, which also allows the material (powder) disposed therein to be weighed as a whole.

Advantageously, two methods may be used to determine the pourability characteristics. According to the first method, the valve is opened for a defined time and closed. The mass of the powder that has passed through, in combination with the time, provides the possibility to determine the pourability characteristics of the powder. According to the second method, the valve is opened until a predefined quantity/mass of powder has passed through the funnel, wherein the time that the valve is open is measured.

The controllable shut-off valve may be provided for selectively shutting off the powder flow from the funnel section. For example, the shut-off valve may be controlled via a control unit, in particular a central control unit, to quickly open or close the shut-off valve. Advantageously, a pinch valve is used for this purpose, which responds essentially without delay. Preferably, at least one regulating means may be arranged downstream of the shut-off valve (for decoupling the conduction from the mass sensor). Particularly preferably, a regulating means is arranged downstream of each of the shut-off valves, wherein the regulating means is in particular made of elastic material.

Particularly advantageously, an inert gas atmosphere is provided in the powder supply, so that the powder conduits are formed to be impermeable to gas.

In addition, a determination device may be provided to determine the pourability characteristic based on the change in weight of the powder disposed in the powder supply based on at least the weight (or mass) determined by means of a mass sensor and/or a predetermined time which is necessary until a specific quantity of powder is removed from the funnel section. When the shut-off valve is opened, the powder is passes preferably by gravity out of the funnel section through a corresponding vertical arrangement of the funnel outlet and the adjacent conduit section. Preferably, therefore, the funnel section is arranged above (in particular directly above) the adjacent conduit section to allow the powder to pass vertically from the funnel section into the conduit section.

The determination device may be arranged to determine the pourability characteristic on the basis of the change in weight (or mass) of the powder disposed in the funnel section over a predetermined time period. Alternatively, or additionally, the pourability characteristic may be determined based on a time period required for a predetermined change in weight (or mass) in the funnel section. The pourability of the powder may be determined based on the time required for a predetermined amount of powder to be removed from the funnel section of the powder supply of the device.

Preferably, the device may be configured such that the shut-off valve is opened for a predetermined time period, wherein the mass sensor determines the mass of powder removed during that time period. Preferably, the pourability characteristics of the powder in the powder supply are determined by comparing the determined value (removed mass) with reference values.

Advantageously, at least a first mass sensor may be provided for determining the weight (and/or mass) of the powder disposed in the funnel section and at least a second mass sensor may be provided for determining the weight (and/or mass) of the powder removed from the funnel section. The dual mass sensor arrangement may further increase the accuracy and sensitivity of the present determination.

Further advantageously, a first shut-off valve and a second shut-off valve may be arranged in a consecutive order with respect to each other in the powder flow direction, preferably downstream of the funnel section for selectively shutting off the powder flow. The accuracy and sensitivity of the present determination may thus be further increased.

The funnel section may be (directly) interchangeably arranged in the powder supply, for substituting or replacing funnel sections with different funnel inner wall shapes. The accuracy and sensitivity of the present determination may thus be further increased, because depending on the powder that is being used, an adapted or optimized funnel section with a corresponding funnel inner wall shape may be directly substituted into the powder supply for optimized powder flow. For this purpose, the funnel section may comprise a conical (inner) powder holding area. Advantageously, the inside of the funnel section along which the powder passes may have at least partially (preferably completely) a polished surface.

Preferably, at least one powder removal means may be provided downstream of the shut-off valve for removing the powder in the feed direction. A powder removal means particularly advantageously comprises an ultrasonic exciter, which is arranged such that powder of the powder supply may be passed on by ultrasonic excitation, in the direction of the process area or directly to the powder application unit. According to an advantageous embodiment, the powder removal means is only active when removing powder from the funnel section, for improved discharge of powder from the funnel section.

Particularly preferably, further sensors are provided on the funnel section, in particular at least one moisture sensor for determining the moisture of the powder disposed in the funnel section.

The shut-off valve may preferably be arranged downstream (in particular directly below in a vertical direction) the funnel section, wherein the powder may be preferably removed from the funnel section by gravity (or preferably additionally due to an applied gas pressure) when the shut-off valve is open. The accuracy and sensitivity of the present determination may thus be further increased because, in particular, constant conditions are provided for the present determination.

In addition, the device may comprise a powder application unit for applying a powder layer of the supplied powder (to a component to be manufactured) in the process area. The powder supply may therefore comprise the powder application unit at one end of the powder conduit, so that the powder weighed by the at least one mass sensor is supplied to the powder application unit (preferably automatically) in order to be used for the manufacture of the component. At the other end, in particular, a powder reservoir or a powder main storage may be provided, which serves as a reservoir to make the powder available for the manufacturing method. Between these ends, the funnel section may be provided for the present determination. Furthermore, the funnel section may preferably be located directly below a powder reservoir.

Advantageously, the funnel section may a container with a funnel outlet (intermediate container) which communicates with a feed passage for supplying the powder to the powder application unit. In particular, the powder supply may form a powder circuit. Advantageously, the powder supply may also be set up for automatic powder supply.

A powder bed-based additive manufacturing method with a powder circuit described above may comprise the steps of determining the pourability characteristics of the powder disposed in the powder supply by determining, as a function of time, a weight change of the powder in the funnel section, and determining the pourability characteristics of the powder based on the determined weight change. In addition, the method may comprise the step of adjusting the manufacturing method based on the determined pourability characteristics of the powder in the powder supply.

Thus, the method may comprise the step of determining the pourability characteristics of the powder (directly) that is disposed in the powder supply by (in particular time-dependent) determining the mass (and/or weight) of the powder disposed in the funnel section or removed from the funnel section. Subsequently, a comparison of the value determined by the determination (e.g., mass or weight) may be carried out with predetermined values for determining the pourability characteristics. The predetermined values may advantageously be powder-specific and/or specific to the funnel geometry and may have been determined in advance by conducting experiments or tests.

The step of determining the pourability characteristics may be carried out during the manufacturing of a component and in particular without removing powder from the powder supply. Thus, the present determination does not interrupt the manufacturing method and the measured powder (or powder used for the present determination) may be used directly in the manufacturing method to manufacture the component because the powder is not removed from the feed circuit for the present determination.

The pourability characteristic of the powder disposed in the funnel section may be determined directly by determining the change in weight of the powder in the funnel section. Thus, it is possible to determine the pourability of the powder directly in the feed line (inline in the feed line) without having to remove the powder from the circuit.

Advantageously, the device may be provided such that the powder is re-treated if it is determined that the powder does not correspond to predetermined properties. In particular, an additional drying section may be provided (directly) in the powder supply to allow the moisture content of the powder to be adjusted. For example, drying of the powder may be achieved by the introduction of heat. Said drying may preferably be used when it is determined that the powder pourability does not meet the specifications for manufacturing the particular component. Preferably, the drying section is provided downstream of the funnel section in the powder flow direction.

Preferably, the mass sensor may be set up at least for weighing the powder disposed directly in the funnel section. For even more precise weight determination, at least two opposing mass sensors may be provided for this purpose. The mass sensors are preferably provided directly on the funnel section in order to be able to obtain a measurement result that is as unbiased as possible.

In order to be able to guarantee a stable method and a consistent, high-quality product, continuous (e.g., constant) monitoring of the critical process and quality parameters may be carried out. The measurement of samples in the laboratory is usually not fast enough to be able to intervene and save the process in the event of an error. Moreover, all laboratory procedures are only a momentary assessment. Continuous measurements that take place directly in the process and under the same conditions are more suitable for process control.

At least one regulating means may be provided, which may be arranged downstream of the shut-off valve, for decoupling the line routing from the mass sensor. A regulating means may advantageously made of elastic material. Regulating means are suitable for applications in which incorrectly or misaligned components have to be correctly positioned, or to compensate for inaccuracies in the positioning of parts and thus reduce jamming of opposing parts.

The proposed device may be easily integrated at various locations in the powder circuit (e.g., below the main (powder) main storage). In addition, it provides the possibility to easily and quickly determine a physical property within the existing circuit system, which may be used to determine the process quality of the powder. Moreover, it is still possible to intervene in the powder circuit at suitable points if the process quality of the powder does not meet the requirements. A process improvement may also be achieved because only suitable powder that meets the requirements is introduced into the process chamber to produce the component.

DETAILED DESCRIPTION OF PREFERRED EMBODIMENTS

In the following, embodiments of the present invention are described in detail with reference to exemplary figures. The features of the embodiments may be combined in whole or in part, and the present invention is not limited to the described embodiments.

In contrast to the known prior art, the present invention provides an optimized way of determining the pourability characteristics of a powder, in particular SLM powder, directly within the powder circuit, without requiring an examination of powder samples outside the respective device.

Particularly in the process of selective laser melting, the component quality achieved is to a large extent directly related to the quality and properties of the powder being used. Since an external powder sampling for the determination of the powder pourability as well as other powder properties on the one hand delays the manufacturing process and on the other hand also contains process inaccuracies due to the delay, the inventors propose an optimized system in which the determination of the powder properties can be integrated into the powder circuit so that a removal of the powder outside the powder circuit can be omitted.

Figure 1:
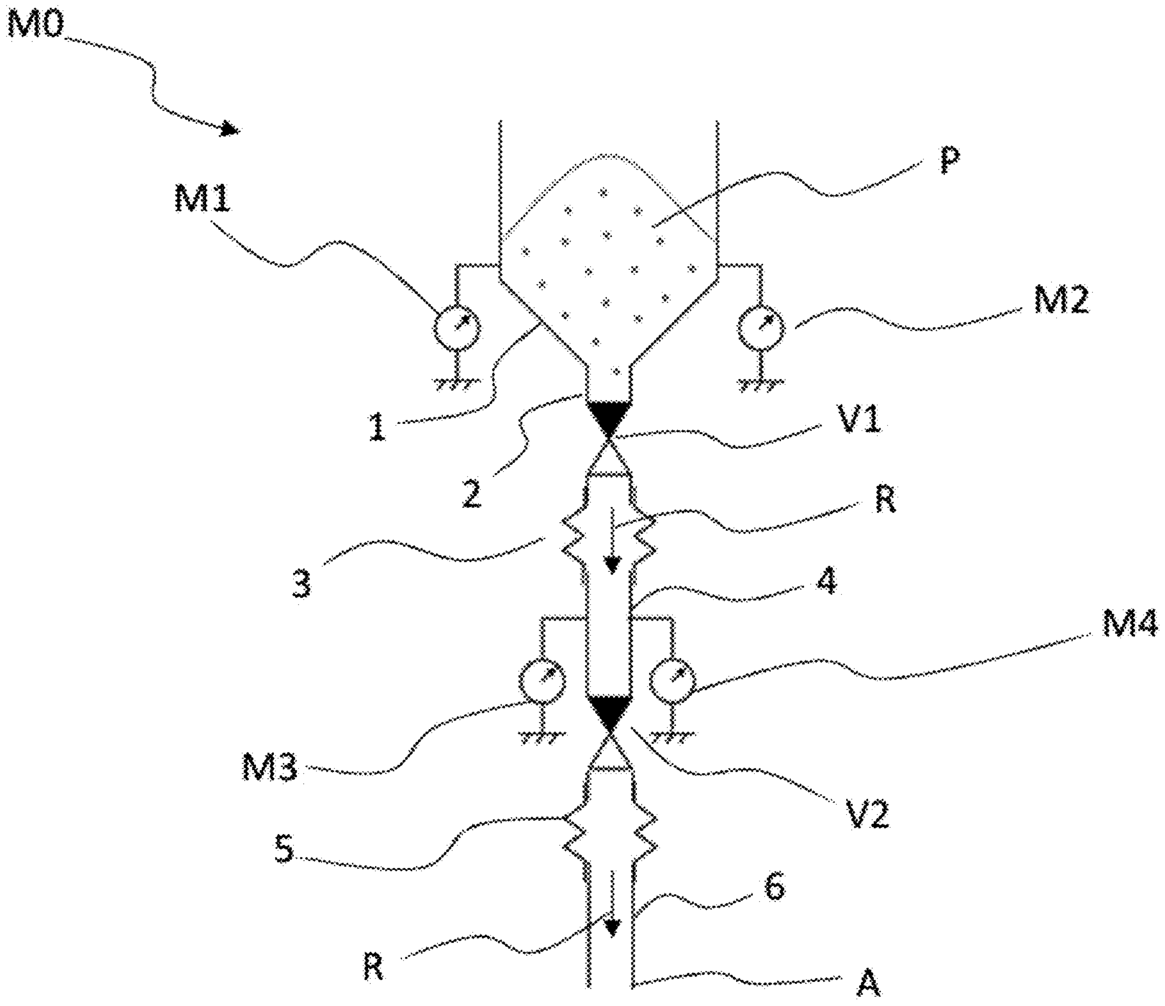
FIG. 1 shows a configuration of a device integrated in the powder circuit.

Accordingly, as shown in FIG. 1, a pourability measurement module M0 is proposed according to the invention, which is installed directly in the powder circuit of the machine. The term machine is to be understood in particular as a device for selective laser melting or laser sintering, with which molded members, such as machine parts, tools, prostheses, pieces of jewelry, and the like can be manufactured by forming them layer by layer from a metallic or ceramic material powder or also from a plastic powder. In the manufacturing process, the material powder is applied layer by layer on a workpiece table in a process chamber PK and is exposed to electromagnetic radiation or particle radiation, but in particular to focused laser radiation, depending on a predefined geometry. The radiation causes heating and consequently fusion or sintering of the material powder of a powder layer, so that certain areas of the powder layer are solidified. In this way, a desired cross-section of a molded member to be manufactured can be generated from the material powder. In the subsequent process step, a further material powder layer can be applied and solidified accordingly until the desired molded member is built up layer by layer.

The module section shown in FIG. 1 can be inserted directly into the powder supply circuit of the machine, so that an interruption of the powder supply can be reduced as far as possible or even avoided because a powder extraction for determining the physical properties can be achieved without actually removing powder from the powder circuit. As shown in FIG. 1, a funnel section 1 is provided in which powder P is disposed. The funnel section 1 may be formed as a container having a funnel-shaped side, in particular a funnel-shaped lower end side, into which powder may be filled. The funnel section 1 is in particular mounted in such a way that a mass determination or weight determination of the powder P disposed in the funnel section 1 can be precisely achieved via the mass sensors M1 and M2. As shown in FIG. 1, two mass sensors M1 and M2 are preferably used for this purpose, which are in particular arranged opposite each other, for example directly in the area of the support points of the funnel section. Advantageously, the funnel section 1 can also be mounted in a floating manner.

The funnel section 1 has a funnel outlet 2 at its lower end, i.e., at the end of the tapered section through the funnel, along which the powder P can be guided to a shut-off valve V1. The shut-off valve V1 serves in particular to shut off a flow of powder from the funnel section 1. When the shut-off valve V1 is open, the powder P emerges from the funnel section 1 at a certain speed due to gravity and because of the funnel shape. As the powder P emerges from the funnel section 1, the weight of the powder P in the funnel section 1 is consequently reduced, as it becomes less and less. By shutting off the shut-off valve V1, the powder flow is stopped and the reduction in weight of the powder P that is disposed in the funnel section 1 can be directly prevented. Pinch valves have proven to be particularly advantageous as shut-off valve V1.

In order to enable the weight of the powder P that is disposed in the funnel section 1 to be determined as accurately as possible, a regulating means 3 is provided downstream of the shut-off valve V1, which can in particular compensate for fluctuations in the vertical direction, in particular in order to achieve a vertical decoupling of the funnel section 1 from the continuing powder lines. Both the funnel outlet 2 and the shut-off valve V1 as well as the regulating means 3 are preferably located below the funnel section 1. Particularly preferably, the system is formed impermeable to gas such that a protective gas can be disposed in the interior of the powder circuit, which is subjected to a predetermined internal pressure.

The inner geometry of the funnel section 1 is preferably formed according to a precisely defined geometry and in particular has a polished surface. Particularly advantageously, the funnel geometry can be based on or adopted from Hall (ISO 4490) or Carney (ASTMB 964) measuring methods. By defining the funnel geometry and using known material powder, the pourability characteristics of the powder can be determined. In particular, by using predetermined characteristic values, which can be determined in advance specific to the powder and the funnel, conclusions can be drawn about the actual pourability characteristics of the powder used by comparing the values actually determined.

FIG. 1 also shows the powder flow direction R along which the powder flows due to gravity, provided the shut-off valve(s) are open. Advantageously, two different methods can be used to determine the pourability characteristics. According to the first method, valve V1 is opened for a defined time and closed. The mass of the powder that has passed through, in combination with the time, provides the possibility to determine the pourability characteristics of the powder. According to the second method, the valve is opened until a predefined quantity/mass of powder has passed through the funnel, wherein the time that the valve is open is measured. This also offers the possibility to determine the pourability characteristic of the powder. The status of the shut-off valve V1 is therefore detected in such a way that a time period of a status change of the valve, i.e., a change from the closed position to the open position or vice versa, can be detected. Preferably, this is done by a control device which is provided accordingly and can be connected to the shut-off valve. Alternatively, time detection can also be achieved via the change in the measured values of the mass sensors M1 and M2, so that, for example, if the measured value of the mass sensor remains unchanged over time, it can be determined that the valve is closed. The mass sensors can also have time-related measuring points that correlate with the opening and closing times of the valve so that, for example, a measurement can only take place when the status of the valve changes.

Alternatively, the mass sensors can measure continuously and record the measured values accordingly. The pourability characteristics of the powder that is used changes, for example, depending on the humidity and/or the temperature or the quality of the powder. The powder P, which is disposed in the funnel section 1, can initially be supplied directly from a powder reservoir, which can also feed the coater B at the same time. After the initial state of the funnel section is reached and the powder P is filled in the funnel section, the measurement of the pourability characteristics of the powder can then be started directly. Preferably, the determined quality value of the powder can be supplied directly into the control system of the machine in order to thereby influence the workpiece manufacturing process, for example to change the behavior of the laser or to change the layer thickness and/or application speed of the powder layer of the manufacturing process and optimally adapt it to the powder that is disposed. Alternatively, and/or additionally, it is also possible to rework the powder according to the determined powder quality or pourability characteristics and to perform a reworking, for example, via a heating unit or a drying unit, in order to improve the properties of the powder and thus to optimize the manufacturing quality of the component.

In FIG. 1, downstream of the shut-off valve V1 and the regulating means 3 in the powder flow direction R1, there is a first conduit section 4, which is formed via associated mass sensors M3 and M4 for determining the mass or weight of the powder that is disposed in the conduit section 4. Advantageously, a determination of the weight of the powder P that is disposed in the conduit section 4 is made possible via corresponding mass sensors M3 and M4 at the bearing points of the first conduit section 4. The first conduit section 4 can be closed off via the shut-off valve V2. The shut-off valve V2 is arranged downstream of the first conduit section 4 in the powder flow direction R. The first conduit section 4 can be tubular with parallel side surfaces. The precision of the determined pourability characteristics of the powder can be significantly increased by the determination of the weight of the powder P disposed in the first conduit section 4 in combination with the controlled shut-off valve V1 and the determination of the weight on the basis of the measured values of the mass sensors M1 and M2.

Downstream of the shut-off valve V2 there is a further regulating means 5, which enables the first conduit section 4 to be decoupled and thus a highly precise measurement of the powder P that is disposed in the first conduit section 4. Further in powder flow direction R there is the second conduit section 6 as part of the powder circuit. This conduit section can, for example, lead to a feed section, which is supplied to the coater B, or via a line to a main storage or a powder reservoir PS, in which the majority of the powder in the powder circuit is stored. The proposed solution can thus be easily integrated at various points in the powder circuit, in particular below the powder reservoir. In addition, this offers the possibility to easily and quickly determine a physical property of the powder within an existing powder circuit system, in order to thus determine the process quality of the powder. In addition, it is still possible to intervene at suitable points in the powder circuit if the process quality of the powder does not meet the desired requirements. Advantageously, only suitable powder is supplied into the process chamber.

FIG. 1 shows a funnel outlet geometry which is supplied with powder, whereby a shut-off valve, which is for example a pinch valve, is arranged below the funnel opening. Mass sensors are used to determine the mass or weight of the powder in the funnel section. Downstream of the powder flow direction R there is provided a first conduit section 4, which can also be formed as a vessel or as a pipe and which has a further shut-off valve V2 in the lower area and which allows the powder received to be weighed. The system is connected to the powder circulation system via the second conduit section 6. Advantageously, regulating means are provided so that the weighing in the individual sections remains unaffected. Advantageously, the system is also operated with inert gas and subjected to an internal pressure for further improvement of the property determination and the powder flow. Thus, according to the invention, an inline determination of the pourability of a powder, in particular SLM powder, is provided.

Figure 2A:
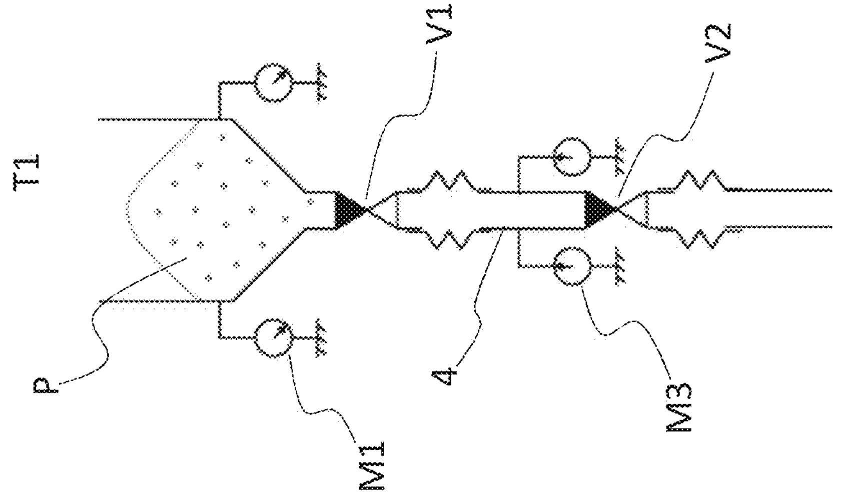
FIG. 2A, 2B, 2C show the method of powder pourability determination.
Figure 2B:
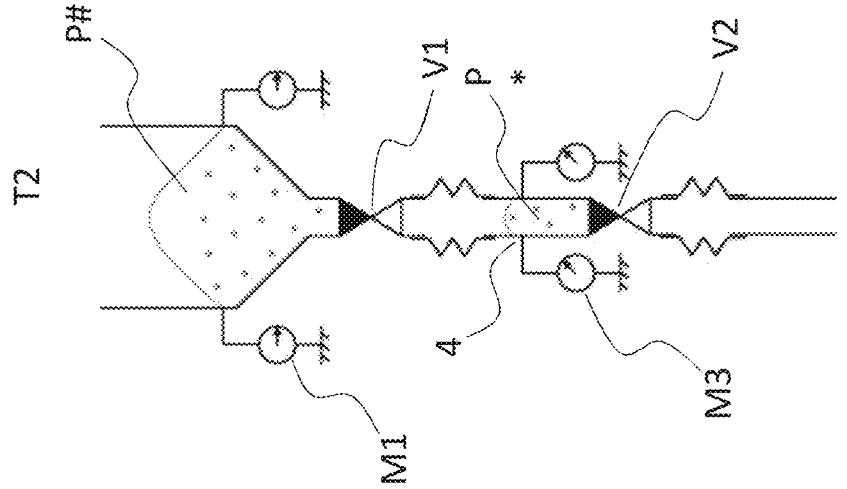

In FIGS. 2A, 2B and 20, three different points in time T1, T2 and T3 are shown to explain an advantageous process for determining the pourability of the powder P that is used.

At time T1, the powder P is in the funnel section and the mass sensors M1 and M2 show the corresponding value. The shut-off valve V1 is in the closed position and there is no powder in the first conduit section 4 and the mass sensors M3 and M4 detect the weight of the corresponding empty conduit section.

Figure 2C:
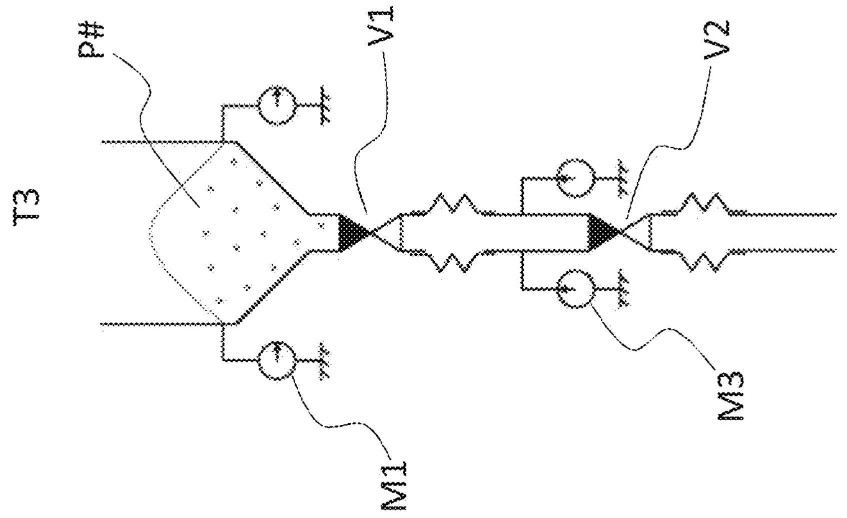

At the time T2, the shut-off valve V1 is closed after being open, depending on a certain time or a certain amount of powder or mass that has passed out. The remaining powder quantity P #in the funnel section thus corresponds to the powder quantity according to time T1 minus the powder quantity P* which has been removed. The mass sensors M1 and M2 detect the remaining powder in the funnel section. The powder quantity P* which has been removed can in turn be weighed via the mass sensors M3 and M4 when the shut-off valve V2 is closed, as shown in FIG. 2B. Through this double determination, via the funnel section 1 and via the first conduit section 4, a highly precise determination of the discharged powder or the mass and weight as well as consequently a determination of the pourability characteristics of the powder used can be achieved. Finally, as shown in FIG. 2C, at time T3, the shut-off valve V2 is opened so that the conduit section 4 is emptied to be ready for a further measuring process. The funnel section 1 contains the remaining powder P#.

Figure 3:
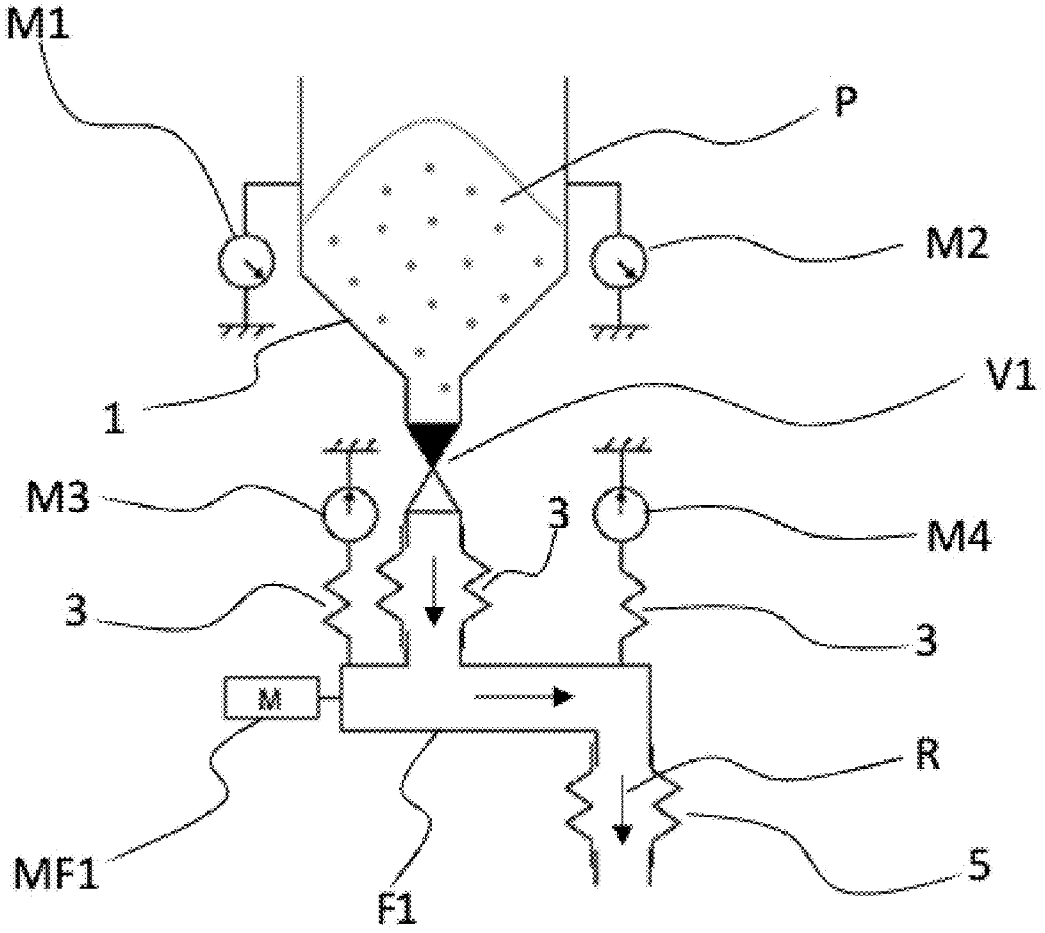
FIG. 3 shows the configuration of a further device integrated in the powder circuit.

FIG. 3 shows another advantageous embodiment. The powder P is provided in the funnel section 1, which can be weighed via the at least two mass sensors M1 and M2. Downstream of the funnel outlet in the powder flow direction is the shut-off valve V1. Downstream of the shut-off valve V1 is the regulating means 3, which leads into a vibrating feeder F1. The vibrating feeder F1 essentially comprises a horizontally arranged pipe section which is supplied with powder from the regulating means 3 via a vertical inflow. Moreover, a motor MF1 of the vibrating feeder is provided for driving the vibrating feeder and consequently for transporting the powder that is disposed in the vibrating feeder F1 up to a powder outlet of the vibrating feeder, which advantageously leads into a regulating means M5. The main body of the vibrating feeder F1, which is for example a tube section, is weighed via mass sensors M3 and M4. Advantageously, these mass sensors are used when supporting the main body of the vibrating feeder F1 in order to enable precise determination of the powder disposed in the vibrating feeder F1. Powder that is thus supplied into the vibrating feeder below the valve V1, is weighed there and then discharged via the vibrating feeder. The vibrating feeder outlet is located in the end section of the main body and is connected to the powder circuit via a regulating means. That is, the weighing in the individual sections remains unaffected.

Figure 4C:
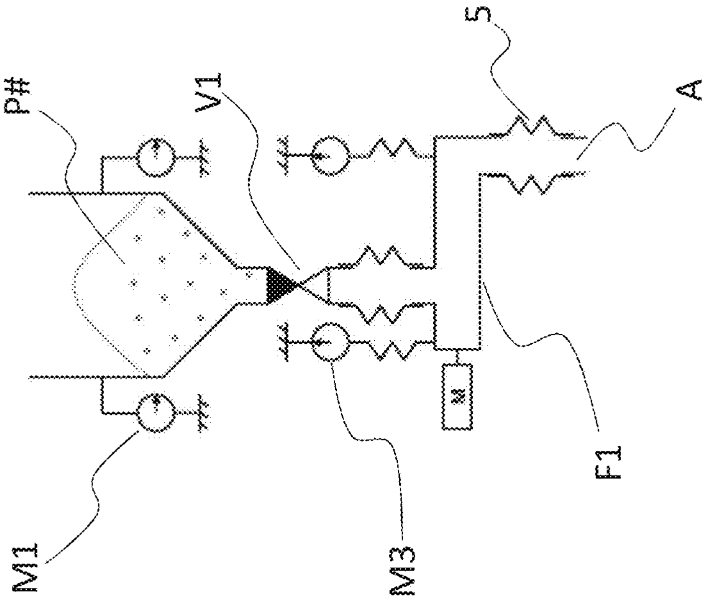
FIG. 4A, 4B, 4C show the method of a powder pourability determination.
Figure 4B:
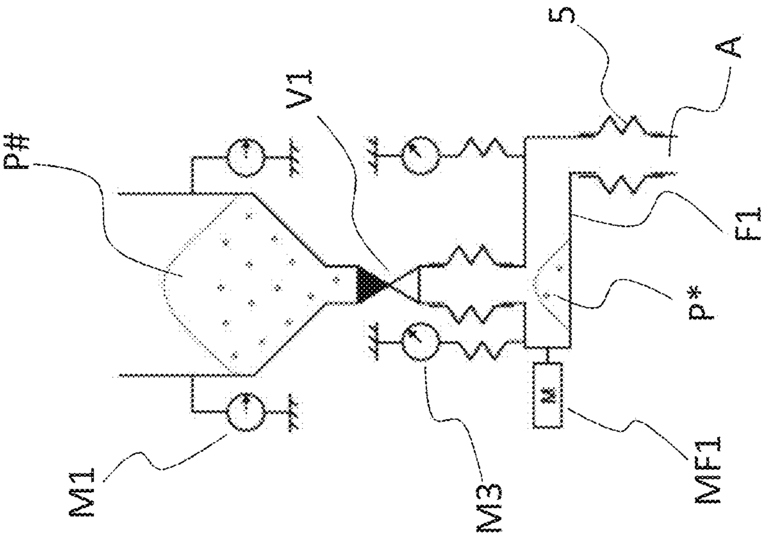
Figure 4A:
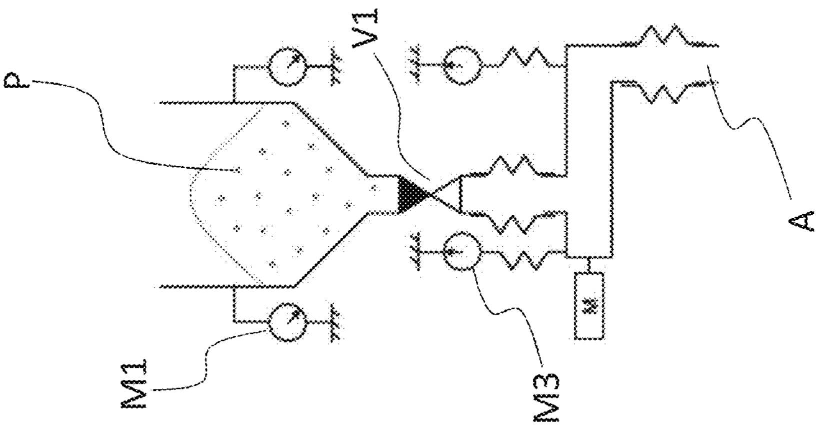

FIGS. 4A, 4B and 4C show an example of a pourability determination using the device shown in FIG. 3. FIG. 4A shows the initial position in which the powder P is disposed in the funnel section 1 and is weighed via the mass sensors M1 and/or M2. The shut-off valve V1 is closed. The main body of the vibrating feeder is empty of powder and preferably also weighed in order to determine the starting value. As shown in FIG. 4B, a powder quantity P* which has been removed from the funnel section 1 through the opening of the shut-off valve V1, for example in accordance of a certain time or in accordance of a certain measured value, for example of the mass sensor M1 and/or M2 and thus of the remaining powder mass P#. The powder quantity P* which has been removed can be weighed in the vibrating feeder F1, the powder being disposed in the main body of the vibrating feeder. After activation of the vibrating feeder and in particular of the corresponding motor MF1, the powder quantity P* which has been removed can be completely discharged from the vibrating feeder F1, so that the latter is substantially empty of powder. Advantageously, as already mentioned above, this system can also be operated with inert gas and be subjected to an internal pressure. By using the vibrating feeder, the second shut-off valve can be omitted so that preferably even more accurate measurements can be carried out.

Figure 5:
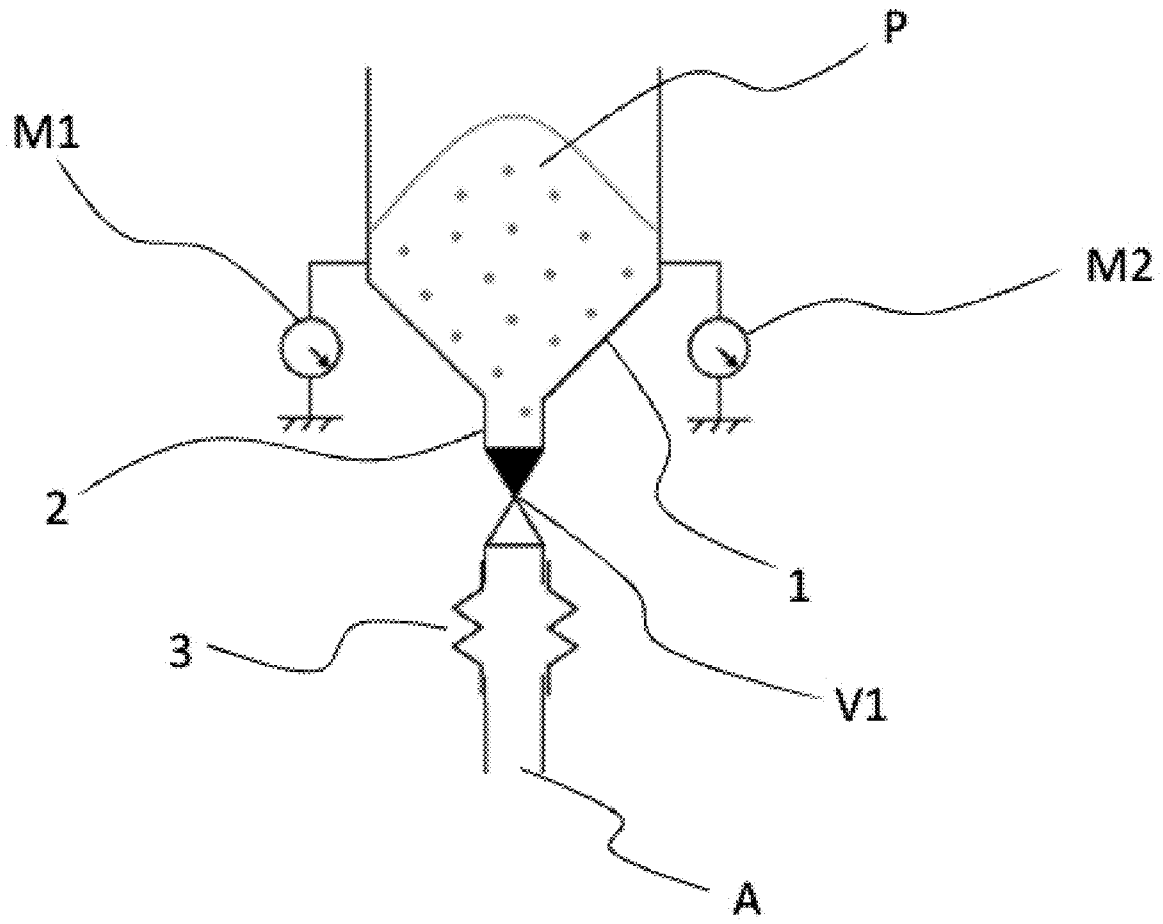
FIG. 5 shows the configuration of a further device integrated in the powder circuit.

FIG. 5 shows a simplified example in which only the shut-off valve V1 is provided for measuring the powder P that is disposed in the funnel section 1 by means of the mass sensors M1 and M2. The regulating means 3 can be used to connect the device directly to the powder circuit via the outlet A. In this embodiment, the pourability characteristics are thus determined only by determining the weight or mass of the powder P that is disposed in the funnel section 1 before and after the shut-off valve V1 is opened, wherein the measured values are being compared with the predetermined values which have been predefined for the characteristic powder and the characteristic funnel section.

Figure 6A:
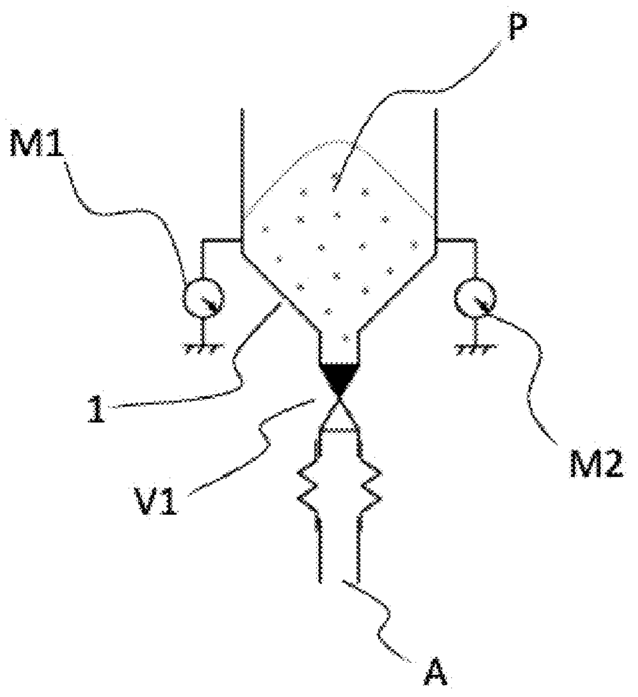
FIG. 6A, 6B show the method of a powder pourability determination.
Figure 6B:
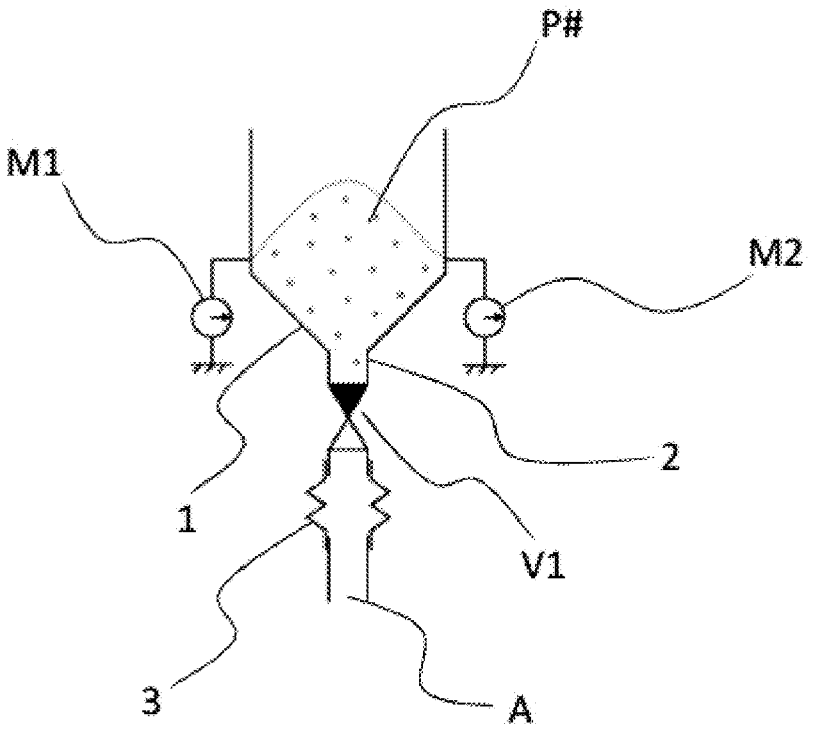

The determination of the powder mass P is further shown in FIGS. 6A and 6B, wherein FIG. 6A shows the initial state and FIG. 6B shows the state after a quantity of powder has been removed from the funnel section 1 by opening the shut-off valve V1. By comparing the determined mass by means of the mass sensor M1 and/or M2 of the initial powder quantity P with the remaining powder quantity P#in FIG. 6B, the decrease in mass can be determined, whereby at the same time a determination of the pourability characteristics of the powder that is disposed in the funnel section 1 can be achieved via the temporal recording of the opening time of the shut-off valve V1. In order to enable measurement of the powder P that is disposed in the funnel section 1, a regulating means 3 is provided, which is preferably arranged downstream of the shut-off valve V1.

Figure 7:
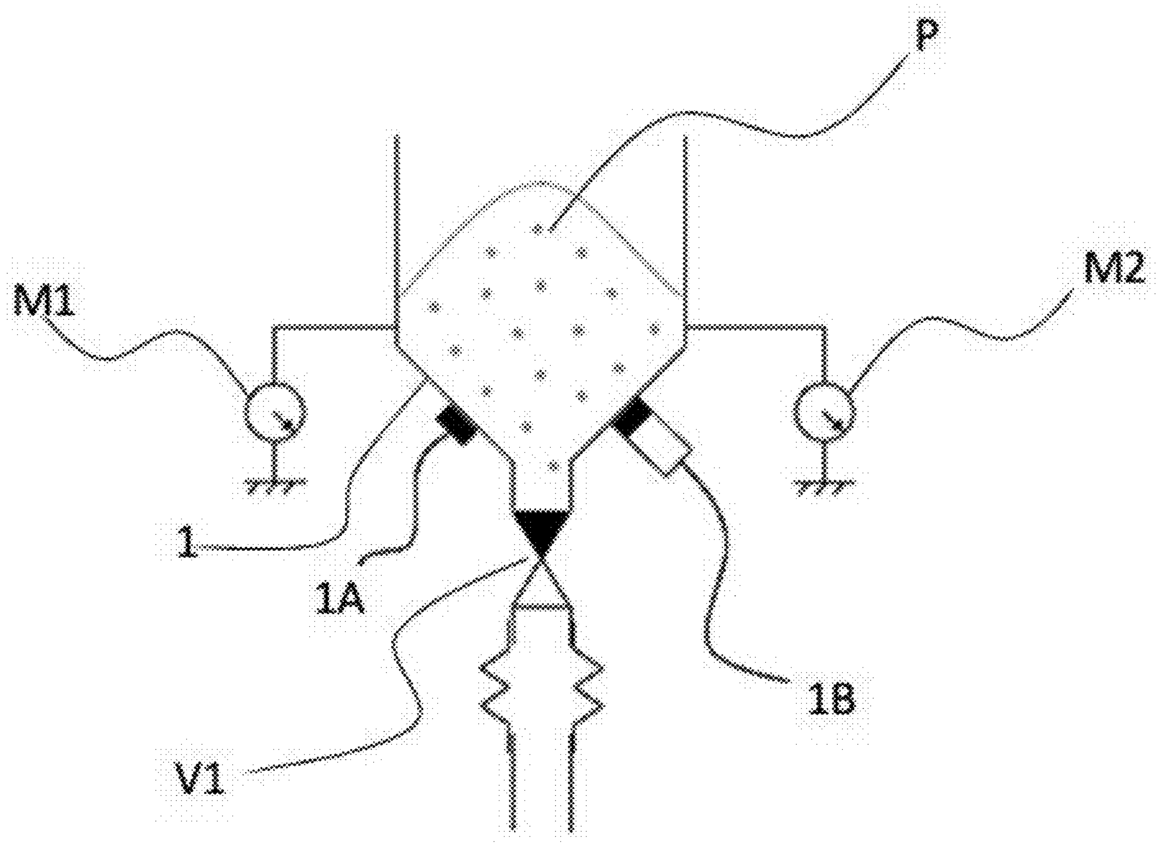
FIG. 7 shows an advantageous further development of the device.

FIG. 7 shows an advantageous further development of the aforementioned embodiments. In addition to the mass sensors M1 and M2, which determine the mass of the powder P that is disposed in the funnel section 1, a moisture sensor 1B and a removal means 1A are provided. Preferably, both the removal means and the moisture sensor are provided directly in the funnel section 1. The moisture sensor 1B can be used to determine the moisture of the powder P that is disposed in the funnel section 1. To improve the powder discharge, the removal means 1A can be provided, which facilitates a flow of the powder P, for example by introducing vibrations in the funnel section 1. By determining different time and/or weight values for different powder qualities, a database can be created in which the corresponding pourability or pourability characteristic is recorded. If a known powder with unknown powder quality is used, the pourability characteristic of the powder used can be deduced by comparing the values recorded in the database with the current measured values or determination values of the mass sensors M1 or M2 as well as the opening time of the closing valve and the removed powder mass. By additionally using the moisture sensor, an even more precise determination is possible regarding the pourability characteristics of the powder that is used. The removal means used can preferably be an ultrasonic exciter which is active during the measurement or only in the event of a possible blockage of the funnel. Preferably, the funnel geometry used has a funnel shape of the funnels used in Hall or Carney measurement methods, or another standardized funnel shape for measurement. Such a preferred funnel shape is shown as an example in FIG. 8.

Figure 8:
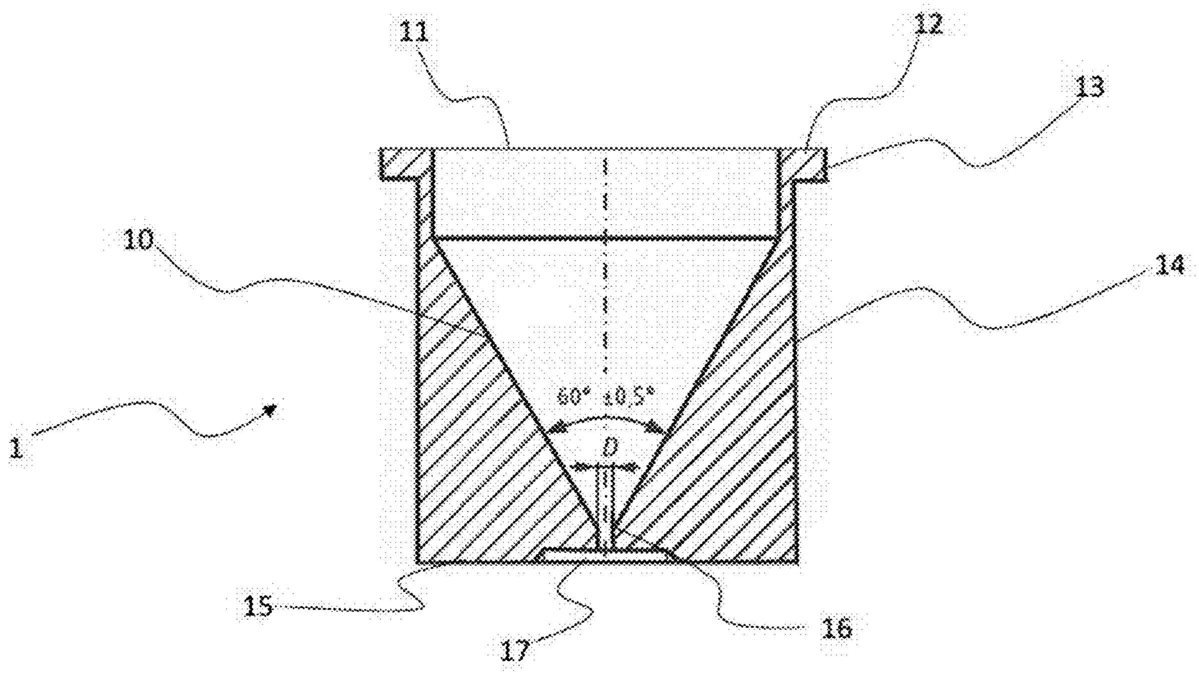
FIG. 8 shows an advantageous funnel section 1.

The advantageous funnel section 1 shown in FIG. 8 has a large receiving opening 11, through which the powder supply into the funnel section 1, in particular from the powder reservoir or a powder main storage, can take place. The upper side 12 is thereby directly connected to the pipe and/or to the main storage. Advantageously, the flange 13 is used for this purpose. The main body 14 has the funnel geometry 10. The funnel geometry 10 is preferably selected according to a standardized funnel shape for determining the pourability of material powder. Advantageously, the funnel geometry has an opening angle of 60 degrees±0.5 degrees and a predefined funnel outlet diameter D. The funnel outlet 2 leads into the opening section 17 which can be connected to the shut-off valve V1. The shut-off valve V1 thus faces the funnel section bottom portion 15. Preferably, the inside of the funnel section, i.e., the funnel geometry 10, is a polished surface. Thus, advantageously, a calibrated funnel is used, for example according to DIN-EN-ISO4490 or ASTMB964.

Figure 9:
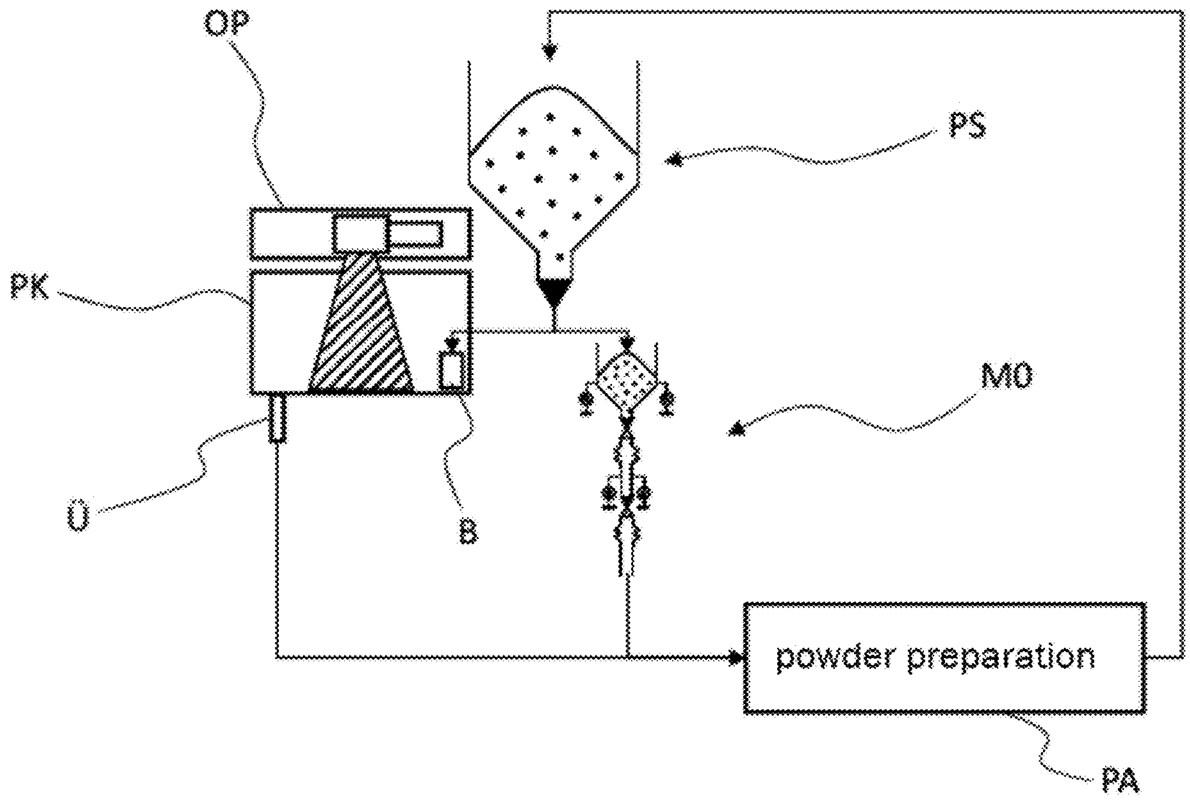
FIG. 9 shows an advantageous powder circuit.

FIG. 9 shows an exemplary powder circuit. The powder is mainly stored in the powder reservoir PS, which can be closed by an appropriate valve. The powder from the powder reservoir can be made available directly to the pourability measurement module M0 and the coater B, preferably simultaneously. The powder used for the pourability measurement by the pourability measurement module M0 is in turn returned directly to the powder reservoir PS via the powder preparation PA, similarly to the powder which is discharged from the process chamber PK via the bleeder Ü. As an example, the optics module OP carries the laser for solidifying the respective powder layer. As shown, it is therefore possible to enable a pourability determination of the actually used powder in parallel to the powder supply to the coater B. Further, the embodiment also enables a reuse of the measured powder by connecting the pourability measurement module M0 directly to the powder preparation PA. In addition, conditioning means can be provided in the powder circuit, as already described, to optimize the powder properties, such as a drying unit or a heating unit.

Figure 10:
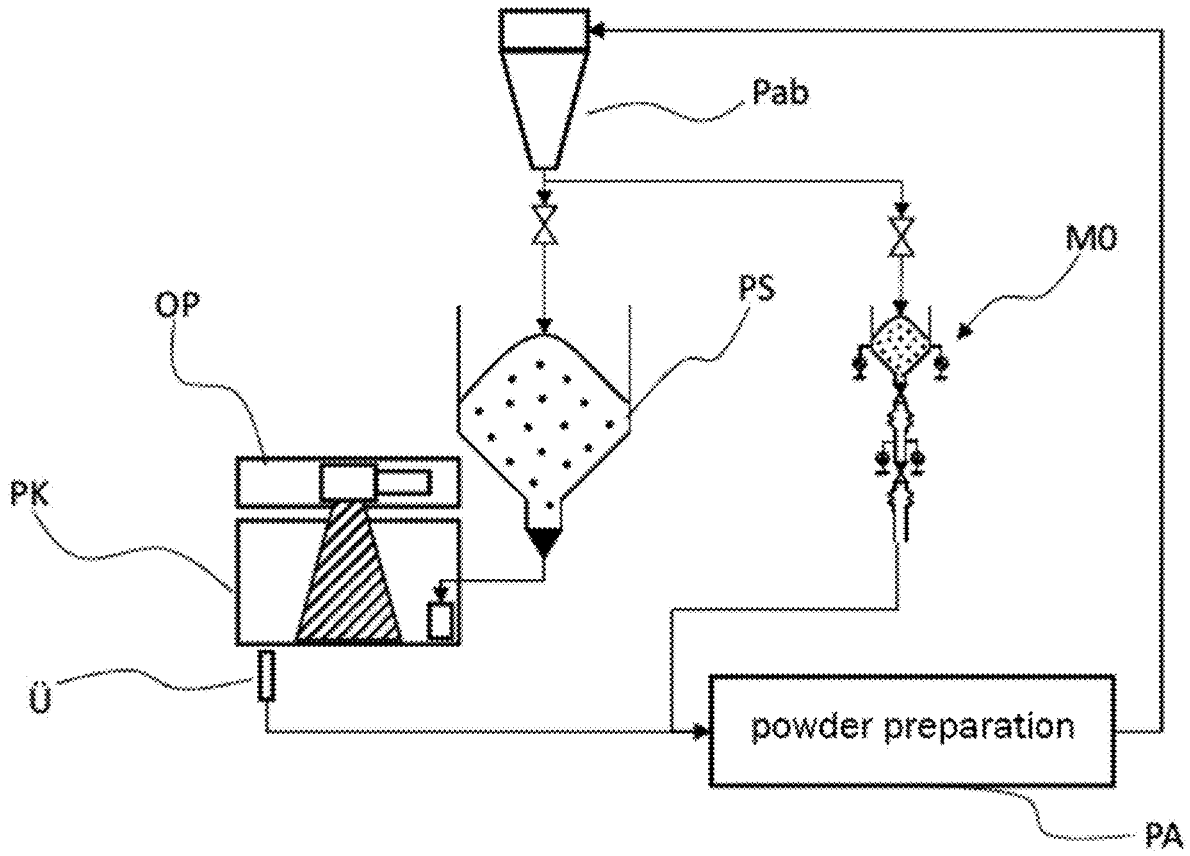
FIG. 10 shows a further advantageous powder circuit.

Another advantageous embodiment is shown in FIG. 10, wherein a powder separation unit Pab is provided, which receives the powder from the powder preparation Pa. Via corresponding valves, the powder of the powder separation unit can be supplied to the pourability measurement module M0 and simultaneously to the powder reservoir PS (main storage). The powder reservoir supplies the powder to the coater B, which provides the layers in the process chamber PK. Excess powder is returned to the powder preparation via the bleeder Ü. The optics module OP is also provided accordingly.

Existing features, components and specific details can be interchanged and/or combined to create further embodiments, depending on the required purpose of use. Any modifications that are within the scope of the skilled person's knowledge are implicitly disclosed with the present description.

The invention claimed is:

1. A device for manufacturing components layer by layer by locally selective solidification of material powder in a process area by electromagnetic radiation or particle radiation, comprising:

a powder supply for supplying powder to the process area, wherein the powder supply is comprising:

a powder conduit connected to a funnel section, and at least one controllable shut-off valve which is arranged downstream of the funnel section in a powder flow direction, wherein for determining pourability characteristics of the powder at least one sensor is provided for time-dependent determination of mass of the powder which is disposed in the funnel section or which is removed from the funnel section, and wherein the at least one sensor is provided in the funnel section.

2. The device according to claim 1, wherein a determining device is provided for determining on a basis of at least weight determined by the sensor the pourability characteristics of the powder disposed in the powder supply.

3. The device according to claim 2, wherein a determination device is configured to determine the pourability characteristic based on a change in weight of the powder disposed in the funnel section in a predetermined time period and/or on a time period which is required for a predetermined change in weight in the funnel section.

4. The device according to claim 1, wherein the at least one sensor is a mass sensor and the mass sensor is arranged such that the determination of the pourability characteristics of the powder is performed inline.

5. The device according to claim 3, wherein the device is configured to open the shut-off valve for a predetermined time period and to determine the removed powder mass by means of the mass sensor and to determine the pourability characteristics of the powder disposed in the powder supply by comparison with reference values.

6. The device according to claim 4, wherein at least a first mass sensor is provided for determining weight of the powder disposed in the funnel section and at least a second mass sensor is provided for determining the weight of the powder removed from the funnel section.

7. The device according to claim 1, wherein the controllable shut-off valve is provided for selectively shutting off the powder flow from the funnel section, and wherein at least one regulator is arranged downstream of the shut-off valve.

8. The device according to claim 1, wherein a first shut-off valve and a second shut-off valve are arranged in a consecutive order with respect to each other in the powder flow direction.

9. The device according to claim 1, wherein the funnel section is interchangeably arranged in the powder supply, for substituting funnel sections with different funnel inner wall shapes.

10. The device according to claim 1, wherein the shut-off valve is arranged below the funnel section and the powder is removed from the funnel section by gravity when the shut-off valve is opened.

11. The device according to claim 1, wherein a powder application unit is provided to apply a powder layer of the supplied powder, and wherein the funnel section includes a container with a funnel outlet which communicates with a feed passage for supplying the powder to the powder application unit.

12. The device according to claim 1, wherein at least one powder removal means is provided downstream of the shut-off valve for removing the powder in a feed direction, and wherein at least one moisture sensor is provided for measuring the powder disposed in the funnel section.

13. The device according to claim 1, wherein an inner side of the funnel section along which the powder passes is at least partly a polished surface.

14. A powder bed-based additive manufacturing method, comprising a powder supply according to claim 1, wherein the method comprises:

determining the pourability characteristics of the powder disposed in the powder supply by determining, as a function of time, a mass of the powder disposed in the funnel section or removed from the funnel section, as a determined value, and comparing the determined value with predetermined values for determining pourability characteristics.

15. The method according to claim 14, wherein the step of determining the pourability characteristics is executed during a continuous manufacturing of a component.

16. The method according to claim 14, comprising the steps:

determining the mass of powder disposed in the funnel section, by means of one or more mass sensors;

opening a shut-off valve to remove at least part of the powder disposed in the funnel section;

after a predetermined time, closing the shut-off valve and determining the mass of the powder remaining in the funnel section, or continuously determining the mass of powder removed from the funnel section and, after reaching a predetermined discharge mass, determining the time required for discharging the mass; and determining the powder flow by comparing the determined mass or the determined time with predetermined values.

* * * * *